W. M. NORDGREN.

MUFFLER.

APPLICATION FILED MAR. 27, 1918.

Reissued May 7, 1918. 14,469.

Inventor:
Werner M. Nordgren,
by: Albert G. Davis
His Attorney.

UNITED STATES PATENT OFFICE.

WERNER M. NORDGREN, OF CHARLOTTENBURG, GERMANY, ASSIGNOR TO GENERAL ELECTRIC COMPANY, A CORPORATION OF NEW YORK.

MUFFLER.

14,469. Specification of Reissued Letters Patent. Reissued May 7, 1918.

Original No. 1,255,556, dated February 5, 1918, Serial No. 59,541, filed November 4, 1915. Application for reissue filed March 27, 1918. Serial No. 225,135.

*To all whom it may concern:*

Be it known that I, WERNER M. NORDGREN, a subject of the King of Sweden, residing at Charlottenburg, Germany, have invented certain new and useful Improvements in Mufflers, of which the following is a specification.

This invention relates to devices for silencing the noise of the exhaust gases of an internal combustion engine or the like, and its object is to accomplish that result by a simple and inexpensive contrivance.

Figure 1:
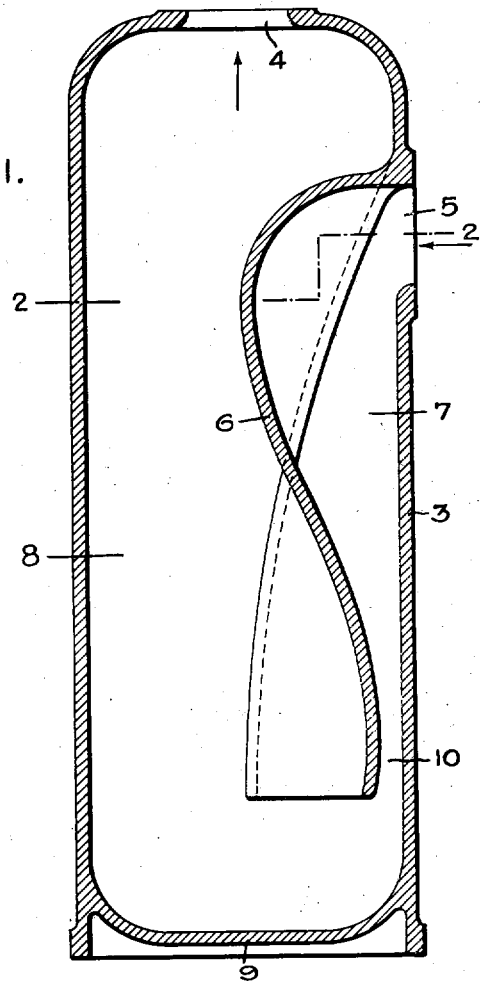
Figure 2:
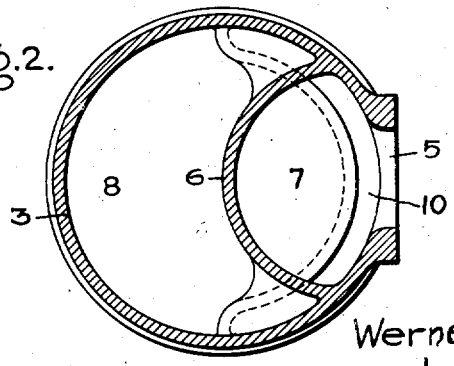

In the accompanying drawing, Figure 1 is a longitudinal section of my improved muffler, and Fig. 2 is a cross-section of the same on the line 2—2, Fig. 1. The hollow body 3 is preferably cylindrical with an exit opening 4 in its upper end. The entrance opening or inlet 5 for the exhaust gases is located in one side of the body near its upper end. Inside the body is a partition 6 which divides the interior of the muffler into an entrance compartment 7 and an exit compartment 8. The inlet 5 opens into the compartment 7, and the exit opening 4 leads out of the exit compartment 8.

The partition 6 is rounded out opposite the inlet 5 forming a reception chamber of considerable capacity, but as it passes downwardly it gradually approaches the side of the body of the muffler and finally becomes a semi-cylindrical wall concentric with and not far from the side wall of said body. The edges of the partition are at all times united to the walls of the body, so that at the lower end of said partition, which is a little distance from the bottom 9 of the body, there is an outlet opening 10 of considerable length but of slight width. As a result of this construction, the cross-sectional area of the entrance compartment gradually decreases from the reception chamber to the outlet chamber 8. The partition 6 not only divides the interior of the body into two chambers but it also forms in effect a nozzle for increasing the velocity of the exhaust fluid.

The operation is as follows: The exhaust gases of the engine enter intermittently at 5 into the comparatively roomy reception chamber and flow from there down through the narrowing entrance compartment 7 through the restricted outlet 10 into the lower end of the much larger exit compartment 8. They enter this at considerable speed, and immediately expand completely or substantially so and pass up and out through the exit opening 4. The curved shape of the partition 6 guides the gases easily and without eddies to the compartment 8. The changes in direction, and the widening and thinning of the gas stream as it flows toward the outlet 4, all serve to smooth out the successive impulses and quiet the popping noise of the exhaust.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

A muffler comprising a casing closed at one end and having an exit opening at the other end, said casing having an inlet opening in one side adjacent the end having the exit opening, and a partition wall which extends from a point between said openings toward the closed end of the casing, terminating short thereof, said partition being rounded out opposite the inlet opening to form with the side wall of the casing a pocket, and gradually approaching the side wall toward the closed end of the casing and at the same time gradually widening out so as to form a long narrow outlet passage between said partition and the side wall.

In witness whereof, I have hereunto set my hand this 23d day of September, 1915.

WERNER M. NORDGREN.

Witnesses:
P. WAGNER,
W. BELLMANN.